Sept. 27, 1960  R. L. McCARTHY ET AL  2,954,421
LOW-LOSS CABLE AND METHOD OF FABRICATION
Filed July 20, 1954
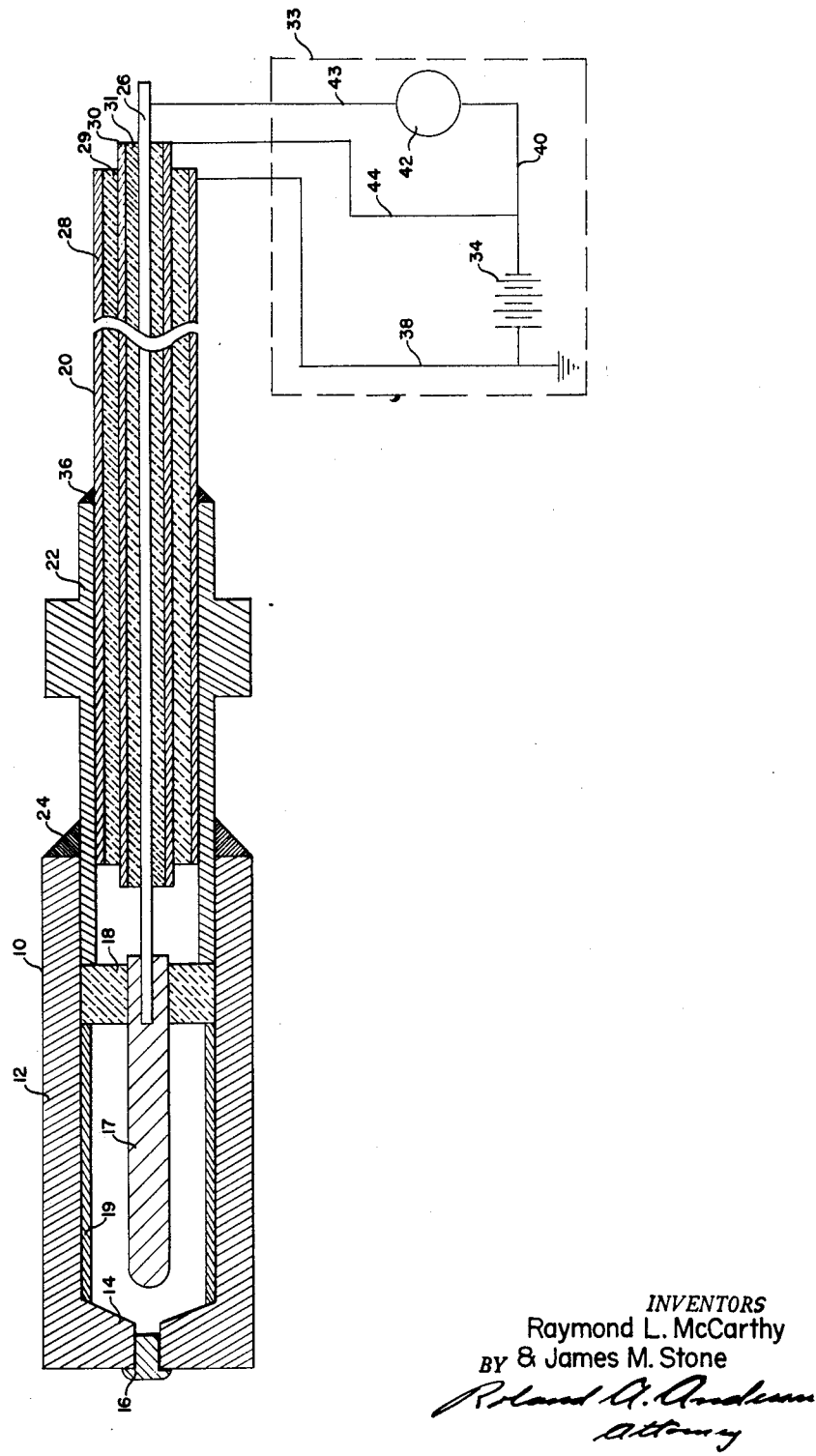
INVENTORS
Raymond L. McCarthy
BY & James M. Stone United States Patent Office 2,954,421
Patented Sept. 27, 1960

2,954,421

LOW-LOSS CABLE AND METHOD OF FABRICATION

Raymond L. McCarthy, Westtown, Pa., and James M. Stone, Newark, Del., assignors to the United States of America as represented by the United States Atomic Energy Commission Filed July 20, 1954, Ser. No. 444,677

4 Claims. (Cl. 174—102)

This invention relates to an insulated cable especially adapted for use in a field of nuclear radiation and in particular this invention relates to a coaxial cable capable of carrying very small currents at high voltage with little leakage and having great stability under irradiation by all types of nuclear particles, as, for example, in a neutronic reactor.

The transmission cable used between a detector of nuclear radiation and its meter and power supply generally is a coaxial cable, that is, one having central conductor in spaced relation to a tubular conductor surrounding it. The annulus between the axial and tubular conductors contains a dielectric material, most often a polymer such as polyethylene or polystyrene. While these materials are satisfactory as electrical insulators, they tend to change their properties under continued, intense bombardment in a field of nuclear radiation. Such organic polymeric insulation when used, for example, in a neutronic reactor, loses not only its mechanical properties but also its electrical properties. When the signal derived from the detector is very small, for example of the order of microamperes or less while a potential of several hundred volts is applied across the cable conductors, evidently even small leakage currents through the cable insulation must be avoided. This is particularly true in a neutronic reactor where the cable may be of considerable length and may be in contact with a relatively conductive liquid such as water. In fact, because of these peculiar requirements, it has been impossible heretofore to measure with a single detector both high and low neutron fluxes near the center of a neutronic reactor. Indeed, we know of no case in which it has been possible to measure the central neutron flux of a neutronic reactor operating at a high power level.

Accordingly, it is a general object of this invention to provide an improved cable having very low current leakage. Another object is to provide a coaxial cable that is stable under intense, continuous neutron bombardment. A further object is to provide a cable for use with a detector of nuclear radiation under conditions where the signal derived from the radiation detector may be a very small current.

Modifications, advantages and other objects of this invention will appear from the following description which is to be interpreted as illustrative only and not in any limiting sense.

In general this invention is a coaxial cable comprising a central conductor and an axially disposed outer conductor spaced from the central conductor. The annulus between the conductors is filled with a refractory, electrically insulating material selected from a group consisting of asbestos heat treated at a temperature of at least 1000° F. and silica heat treated at a temperature of at least 1800° F. Asbestos, of course, is composed, in the main, of a compound of magnesia and silica.

The accompanying drawing illustrates, mainly in section, a form of coaxial cable constructed in accordance with this invention and shows diagrammatically one way in which the cable is used in the measurement of nuclear radiation. For clarity the dimensions have been considerably exaggerated.

In the drawing, reference numeral 10 indicates an ionization chamber. Reference numeral 20 indicates a cable fabricated in accordance with this invention and reference numeral 33 indicates a diagrammatic representation of a power supply and meter used in combination with the chamber 10 and cable 20.

The ionization chamber 10 comprises a conductive cylinder 12, of aluminum for example, which may serve as one of the electrodes. At one end cylinder 12 has an inwardly extending flange 14 whose opening is sealed by means of a plug 16. Along the axis of the cylinder 12 a rigid, generally cylindrical, conductive electrode 17, which may also be of aluminum, is supported in a high-dielectric insulator 18, of sapphire or alundum for example, positioned in cylinder 12 near the end opposite plug 16. When used as a neutron detector, the chamber 10 may be provided with an internal bushing 19 or electrodeposited coating of uranium or of boron. A bushing is shrunk fit into the cylinder 12 to provide adequate electrical contact.

The cable 20 is connected to the ionization chamber 10 by means of a cylindrical conductive fitting or bushing 22 which, at one end, is in electrical contact with cylinder 12. The fitting 22 is preferably welded to the wall of the ionization chamber, as at 24, to ensure the electrical contact and to provide a fluid-tight seal.

In the illustration selected, cable 20 comprises three conductors, central conductor 26 and a tubular outer conductor 28 spaced from the central conductor and, in the annulus between the central and the outer conductor, an inner tubular conductor 30 spaced from both the outer and the central conductors. The outer tubular conductor 28 is electrically connected to the fitting 22 and is sealed thereto in fluid-tight relation, for example by welding, as at 36. The central conductor 26 is in electrical contact with the central electrode 17 of the ionization chamber. The inner tubular conductor 30 is electrically insulated from the ionization chamber.

In accordance with this invention, the annuli 29 and 31 between the inner and outer tubular conductors and between the central and inner tubular conductors, respectively, are filled with a refractory electrical insulation selected from the group consisting of asbestos heat treated at a temperature of at least 1000° F. and silica heat treated at a temperature of at least 1800° F. The insulation is preferably formed of fibrous varieties of the asbestos and is especially suitable in the form of tow or sliver. Silica is preferably used in braid form.

In order to use the ionization chamber to detect nuclear radiation, it is filled with an ionizable gas; then a potential is applied between the central electrode 17 and the cylindrical electrode 12. The potential is applied by means of the power supply 34 having a grounded terminal connected by means of the wire 38 to the outer tubular conductor 28 and thereby to the cylinder 12. The other terminal of the power supply is connected by means of the wire 40 to a meter 42 which in turn is connected by wire 43 to the central conductor 26 and thereby to the central electrode 17. The last-mentioned terminal of the power supply is also connected to the inner tubular conductor 30 by means of wire 44. In this way the potential between the central conductor 26 and the inner tubular conductor is equal only to the voltage drop through the meter 42. Accordingly, the only leakage current that appears as a signal through the meter results from the relatively small potential drop through the meter and this may be as little as 50 millivolts.

It has been found that asbestos and relatively pure silica are essentially stable under prolonged and intense bombardment by nuclear radiation. Unfortunately, these materials are relatively ineffective as insulation, particularly when small currents are to be measured under a relatively high potential drop. We have discovered that by heating asbestos at a temperature of at least 1000° F. and silica at a temperature of at least 1800° F. the volume resistivity of these materials is increased on an average by about three orders of magnitude: in the case of asbestos approximately from $10^6$ to $10^9$ ohm centimeters and in case of silica approximately from $10^7$ to $10^{10}$ ohm centimeters. We have discovered further that after such heat treatment, not only is the volume resistivity increased to such an extent but it remains substantially stable at the higher value. In contrast, heat treatment at lower temperatures, while initially increasing the volume resistivity, does not effect a permanent improvement. Instead, upon exposure to the atmosphere the volume resistivity decreases almost immediately to its initial value. The effect of the heat treatment is indicated in the examples following, presented here solely for illustration.

In these examples, the electrical resistivity, in terms of "leakage current," was measured by packing the material into an insulated holder having a volume of about 2 cubic centimeters. The holder comprised a pair of spaced electrodes, whose area was sufficient to cover the sample, and polystyrene spacers were used between the electrodes to contain the sample. A potential of about 135 volts from a battery was applied across the electrodes. The current flowing through the sample was measured by means of a microammeter as a measure of the resistivity. The values obtained are referred to as "test current."

EXAMPLE 1

Samples of fibrous Canadian asbestos were heated to the temperatures and held at temperature for the times indicated in Table 1. The electrical resistivity of the samples, in terms of "test current," was measured in the manner indicated before. The time after heat treatment is measured from the removal of the samples from the oven.

*Table 1*

| Heat Treatment | | Test Current After Heat Treatment | |
|---|---|---|---|
| Hours | Temperature (° F.) | Hours | Microamperes |
| 1 | 710 | ⅙ | 470 |
| 1 | 900 | ------ | 120 |
|   |     | 96 | 270 |
| 1 | 950 | ------ | 1.3 |
|   |     | 96 | 7.4 |
|   |     |    | 0.3 |
| 1 | 1,000 | 96 | 0.2 |
|   |       | 168 | 0.4 |
|   |       | ½ | 0.006 |
|   |       | 18 | 0.07 |
| 1 | 1,800 | 66 | 0.2 |
|   |       | 240 | 0.3 |
|   |       | >1,000 | 0.3 |

Where no time is indicated the time was 10 minutes or less after removal from the oven. Of the samples of Canadian asbestos tested, all had test currents in excess of 160 microamperes or more prior to heat treatment, and in some instances the values were more than 1000.

EXAMPLE 2

Samples of fibrous African asbestos were heated in the same manner as those of Example 1. The electrical resistivity in terms of "test current" was measured both before and after the heat treatment in the manner already described. The conditions of the heat treatments and the results obtained are indicated in Table 2. The time after heat treatment was measured from the removal of the samples from the furnace.

*Table 2*

| Heat Treatment | | Test Current | |
|---|---|---|---|
|   |   | Before Heat Treatment | After Heat Treatment |
| Hours | Temperature (° F.) | Microamperes | Hours | Microamperes |
| 1 | 710 | 400 | ⅙ | 6.3 |
|   |     |     | ½ | 26 |
| 1 | 900 | 340 | ½₂ | 0.03 |
|   |     |     | 20 | 9.6 |
|   |     |     | ½₀ | 0.001 |
|   |     |     | 2 | 0.004 |
| 3 | 1,000 | 76 | 20 | 0.05 |
|   |       |    | 68 | 0.06 |
|   |       |    | 240 | 0.11 |
|   |       |    | >1,000 | 0.11 |
|   |       |    | ⅙ | 0.002 |
| 1 | 1,800 | 75 | 18 | 0.1 |
|   |       |    | 66 | 0.03 |
|   |       |    | 240 | 0.01 |
|   |       |    | ⅙ | 0.02 |
| 4 | 1,800 | 200 | 20 | 0.08 |
|   |       |     | 44 | 0.08 |
|   |       |     | 92 | 0.1 |

Samples of asbestos were subjected to spectrographic analysis. The results obtained were as follows: major elements (2 to 99%), magnesium and silicon; minor elements (0.1 to 2%), iron, aluminum and nickel; and various trace elements.

In contrast to the results obtained in Examples 1 and 2 similar tests were run on asbestos by heating at 380° F. for 48 hours to dry the samples. When removed from the oven, the current was measured in the standard holder, as described before. Immediately after removal from the oven the current was 0.005 microampere. After 24 hours a sample was again tested and the current was 260 microamperes. The current measured on this sample before drying at 380° F. was 220 microamperes.

The results obtained in Examples 1 and 2 demonstrate clearly that when asbestos is heated at a temperature of at least 1000° F., its electrical resistivity is permanently increased by several orders of magnitude.

EXAMPLE 3

Tests similar to those described in Examples 1 and 2 were performed on a material that consists essentially of silica. The material used, having the trade name "Refrasil," is manufactured by spinning a borosilicate glass at a relatively low temperature and then leaching the boron from the glass. The material, on spectrographic analysis, is essentially pure silica although it contains some trace elements. The resistivity was measured in the same way as for the other examples. All of the samples except the last were in the form of yarn; the last sample was of bulk fiber. Again, the "hours" after heat treatment were measured from the removal of the samples from the furnace.

Table 3

| Heat Treatment | | Test Current | | |
| --- | --- | --- | --- | --- |
| | | Before Heat Treatment | After Heat Treatment | |
| Hours | Temperature (° F.) | Microamperes | Hours | Microamperes |
| 3 | 1,000 | 5.2 | (¹) | 0.0005 |
| | | | 2 | 0.2 |
| | | | 20 | 7.0 |
| | | | 44 | 4.1 |
| 3 | 1,000 | 7.2 | ⅟₁₆ | 0.002 |
| | | | 68 | 2.8 |
| | | | ½ | 0.001 |
| 1 | 1,800 | 9.5 | 18 | 0.02 |
| | | | 42 | 0.03 |
| | | | 90 | 0.1 |
| 2 | 1,800 | 9.5 | ⅙ | 0.0009 |
| | | | 2 | 0.005 |
| | | | 20 | 0.009 |
| 4 | 1,800 | 9.5 | ⅙ | 0.0008 |
| | | | 18 | 0.001 |
| | | | 42 | 0.009 |
| | | | 90 | 0.01 |
| | | | 162 | 0.009 |
| | | | >1,000 | 0.01 |
| 16 | 1,800 | 4.5 | ⅓ | 0.0006 |
| | | | 240 | 0.1 |
| | | | >1,000 | 0.09 |

¹ Ten minutes or less.

A sample of the "Refrasil" was also dried at 380° F. for 18 hours. When measured less than 10 minutes after removal from the drying oven, the test current was 0.0005 microampere from an original test current of 5.1 microamperes. However, in 5 hours the test current had increased to 3.2 microamperes.

The results obtained in Example 3 demonstrate the permanent increase in resistivity that is obtained by heating silica insulation to a temperature of at least 1800° F.

In order to demonstrate that the increase in resistivity was permanent, 2 samples of the silica insulation and 1 sample each of the Canadian and African asbestos were soaked with distilled water and then dried rapidly by induction heating in a "Radarange." This form of drying removes the water rapidly without heating the material to any great extent. The asbestos samples had each been heated to a temperature of at least 1000° F. for 3 hours or more and had been exposed to the atmosphere for several days. Each of the silica insulation samples had been heated to 1800° F. and exposed to the atmosphere for several days. The test-current results obtained by measuring the resistivity in the manner described above are indicated in Table 4.

Table 4

| Sample: | Leakage current |
| --- | --- |
| Silica | 0.0008 |
| Silica | 0.0012 |
| Canadian asbestos | 0.08 |
| African asbestos | 0.06 |

The Canadian asbestos was tested again after 20 hours and at that time the test current was only 0.12 microampere. The second sample of silica insulation was tested after 40 hours and the test current had increased only to 0.05 microampere.

The preferred method of fabricating the cable differs somewhat depending on the type of insulation used. In the case of fibrous silica, it is preferred to braid a yarn in the form of a tube or sleeve, then heat the tube to at least 1800° F. Thereafter, the tube is drawn on the inner conductor. For a simple two-conductor cable consisting of a central conductor and a tubular conductor, the tubular conductor is drawn over the tubular braid already on the central conductor. Where 3 conductors are used, a second heat-treated tubular braid is drawn over the inner tubular conductor and then the outer tubular conductor is drawn over the second layer of insulation. This method is especially suitable for cable of small outside diameter, for example of the order of a half inch or less. However, where larger volumes are available for the insulation, bulk fiber may be packed between the conductors in the tube. A thirty-foot cable using 0.035-inch silica braid had an average insulation resistance of $2 \times 10^{10}$ ohms.

Because asbestos is a more brittle material than the silica fibers, it is necessary to fabricate the cable in a somewhat different way. The asbestos is preferably converted to the form of tow or sliver and then heated at a temperature of at least 1000° F. After the heat treatment, the tow or sliver is wrapped around the conductor spirally with a small amount of water to hold the asbestos in place temporarily. Then the tubular conductor is drawn over the asbestos covering and the assembly dried, for example by induction heating or by baking at a relatively low temperature. These steps are repeated for the three-conductor cable with the asbestos tow or sliver being wrapped around the inner tubular conductor. In the three-conductor cable using asbestos insulation, the inner tubular conductor is preferably in the form of braided wire to facilitate the removal of water when drying the asbestos.

Cable-and-ionization-chamber combinations, substantially as shown in the accompanying figure and using braided silica insulation, were used to measure the neutron flux in several neutronic reactors. The metal parts of the combination, including the cable conductors, were of aluminum. In one case, the neutron flux was measured for a period of 4½ months with the cable exposed to the neutron flux for that period while immersed in water. A change in the cable resistivity would be indicated by an apparent change in the sensitivity of the system; however, at the end of the 4½ months the system sensitivity remained unchanged. In another case, in a similar test, continuous exposure to a very high neutron flux for 23 days resulted in no change in the sensitivity; in fact, the readings varied by less than 2 percent and this amount is attributable to normal variations in the operation of a neutronic reactor.

In performing the heat treatment the time required will, of course, be a function of the thickness of the material since both silica and asbestos are also thermal insulators and would have a self-insulating effect. For ordinary braided insulation up to about 0.2 inch the heat treatment should preferably be continued for at least 4 hours. In general, it is advisable to determine the time by trial which may be simply done as indicated in the examples given. The time should be long enough to make certain that the resistivity is stabilized, i.e., that it does not increase substantially on exposure to the atmosphere.

In the case of asbestos, it is preferable to heat treat the fibrous material at a temperature of less than 1800° F., for at this temperature the material tends to become brittle and therefore difficult to fabricate. With either type of insulation, the temperature should, of course, be below that at which the material melts.

While we do not wish to be bound by any theory of the nature of our invention, it is believed that the effectiveness of the heat treatment is related to the chemical character of both asbestos and the silica fibers. In asbestos the surface molecules of magnesium hydroxide and/or silicon hydroxide and in silica the surface molecules of silicon hydroxide are hygroscopic. The heat treatment apparently cross-links these compounds to form MgO and $SiO_2$, and the material is thereafter no longer hygroscopic.

While for the purpose of explaining the invention particular embodiments have been described, it is evident that many modifications will be apparent to those skilled in the art. Accordingly, the foregoing description is not intended in any limiting sense but it is intended that the scope of the invention should be limited only by the claims hereinafter set forth.

What is claimed is:

1. A low-loss electrical cable comprising an inner electrical conductor, a tubular electrical conductor coaxial therewith and spaced therefrom and electrical insulation consisting of fibrous silica in the annulus between said conductors, said silica being the product of spun borosilicate glass from which the boron has been leached and which has thereafter been heat treated at a temperature non-melting to the insulation in excess of 1800° F.

2. The low-loss cable of claim 1 in which the silica is in the form of a braid.

3. In an electrical cable comprising an inner electrical conductor and a tubular electrical conductor coaxial therewith and spaced therefrom, improved electrical insulation which comprises an interconductor layer consisting of fibrous silica, said silica being the product of spun borosilicate glass from which the boron has been leached and which has thereafter been heat-treated at a temperature non-melting to the insulation in excess of 1800° F.

4. In an electrical cable comprising an inner electrical conductor and a tubular electrical conductor coaxial therewith and spaced therefrom, improved electrical insulation which comprises an interconductor layer consisting of fibrous silica in the form of a tubular braid, said silica being the product of spun borosilicate glass from which the boron has been leached and which has thereafter been heat-treated at a temperature non-melting to the insulation in excess of 1800° F.

References Cited in the file of this patent

UNITED STATES PATENTS

| Re. 15,727 | Crossley | Dec. 4, 1923 |
| 2,044,175 | McCulloch | June 16, 1936 |
| 2,341,235 | Palmer | Feb. 8, 1944 |
| 2,523,336 | Schroy et al. | Sept. 26, 1950 |
| 2,587,916 | Squier | Mar. 4, 1952 |
| 2,643,487 | Parker | June 30, 1953 |
| 2,718,475 | Radke et al. | Sept. 20, 1955 |

OTHER REFERENCES

Sosman (book): The Properties of Silica, pages 515–524, 1927, The Chemical Catalog Co., 419 Fourth Ave., 29th Street, N. Y.

UNITED STATES PATENT OFFICE
CERTIFICATION OF CORRECTION

Patent No. 2,954,421 September 27, 1960

Raymond L. McCarthy et al.

It is hereby certified that error appears in the above numbered patent requiring correction and that the said Letters Patent should read as corrected below.

Column 4, Table 2, column 5 thereof, twelfth item, for "0.1" read -- 0.01 --; same Table 2, column 5 thereof, fourteenth item, for "0.01" read -- 0.1 --.

Signed and sealed this 15th day of August 1961.

(SEAL)
Attest:

ERNEST W. SWIDER
Attesting Officer

DAVID L. LADD
Commissioner of Patents